United States Patent

Daetz

[11] Patent Number: 5,817,933
[45] Date of Patent: Oct. 6, 1998

[54] SENSOR ARRANGEMENT FOR MEASURING THE MASS OF A FLOWING FLUID

[75] Inventor: Michael Daetz, Tiddische, Germany

[73] Assignee: Deutsche Automobilgesellschaft mbH, Braunschweig, Germany

[21] Appl. No.: 703,732

[22] Filed: Aug. 27, 1996

[30] Foreign Application Priority Data

Sep. 20, 1995 [DE] Germany ................... 195 34 906.7

[51] Int. Cl.[6] ................................................. G01F 1/68
[52] U.S. Cl. ...................................... 73/118.2; 73/204.26
[58] Field of Search .......................... 73/118.2, 204.26, 73/204.15, 204.22

[56] References Cited

U.S. PATENT DOCUMENTS

| | | | |
|---|---|---|---|
| 4,542,650 | 9/1985 | Renken et al. | 73/204.26 |
| 4,936,145 | 6/1990 | Hohenstatt | 73/204.26 |
| 5,038,610 | 8/1991 | Diehl et al. | 73/204.26 |
| 5,520,047 | 5/1996 | Takahashi et al. | 73/204.26 |

FOREIGN PATENT DOCUMENTS

| | | |
|---|---|---|
| 0 137687 | 4/1985 | European Pat. Off. . |
| 3 127061 | 1/1983 | Germany . |
| 3 127081 | 1/1983 | Germany . |
| 3 606853 | 9/1987 | Germany . |
| 3 810868 | 10/1988 | Germany . |
| 3 802422 | 8/1989 | Germany . |
| 3 935778 | 10/1990 | Germany . |
| 4 107876 | 9/1991 | Germany . |
| 4 112601 | 10/1991 | Germany . |
| 4 316067 | 11/1994 | Germany . |
| 4 404505 | 8/1995 | Germany . |

OTHER PUBLICATIONS

John G. Olin, "Split–Film Anemometer Sensors" Fluid Systems (Instruments and Control Systems) Journal of the Southern California Meter Association, Jun. 1970, pp. 106 to 108.

Technical Bulletin TB 20 TSI Split Film Sensor Calibration and Application, Thermo–Systems Inc., St. Paul Minnesota, 18 pages.

H. Strickert "Hitzdraht—und Hitzfilm–Anemometrie" 1974, Index and pp. 8 to 14; Section 1 pp. 16 to 25; Section 5 pp. 90 to 136; Section 6 pp. 137 to 173.

Primary Examiner—George M. Dombroske
Assistant Examiner—Harshad Patel
Attorney, Agent, or Firm—W. G. Fasse; W. F. Fasse

[57] ABSTRACT

A film sensor element is used to determine the mass of a flowing fluid, in particular an air mass flow in the intake tube of an internal combustion engine. Such a sensor is part of a measurement bridge and operates on the hot-wire anemometer principle, designed as a constant-resistance regulator connected to an operational amplifier. To reduce the response time, two separate resistance tracks of a film sensor element are structured in such a way that they are situated perpendicular to the direction of flow (S) with one track (6) along the leading edge and the other track (7) along the trailing edge. The tracks (6, 7) are electrically connected in parallel, such that the current can be divided according to the two resistance values as a current divider. Consequently, if the conductive track at the leading edge of the current divider cools to a greater extent this is counteracted by the rising current in the conductive track at the leading edge and thus greater electrical power is applied to the track at the leading edge. This is particularly advantageous in dual sensors for detecting the flow direction.

12 Claims, 3 Drawing Sheets

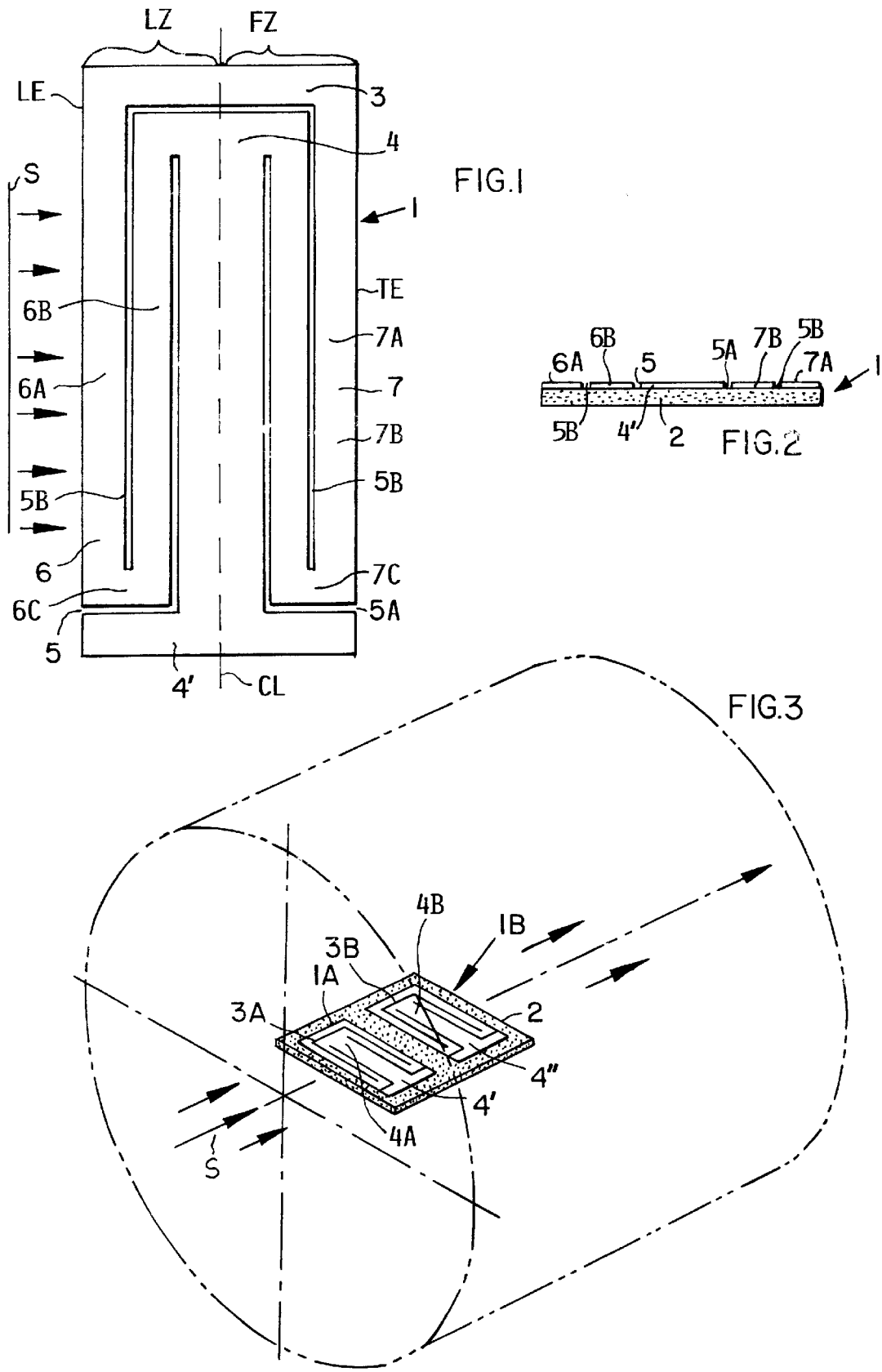

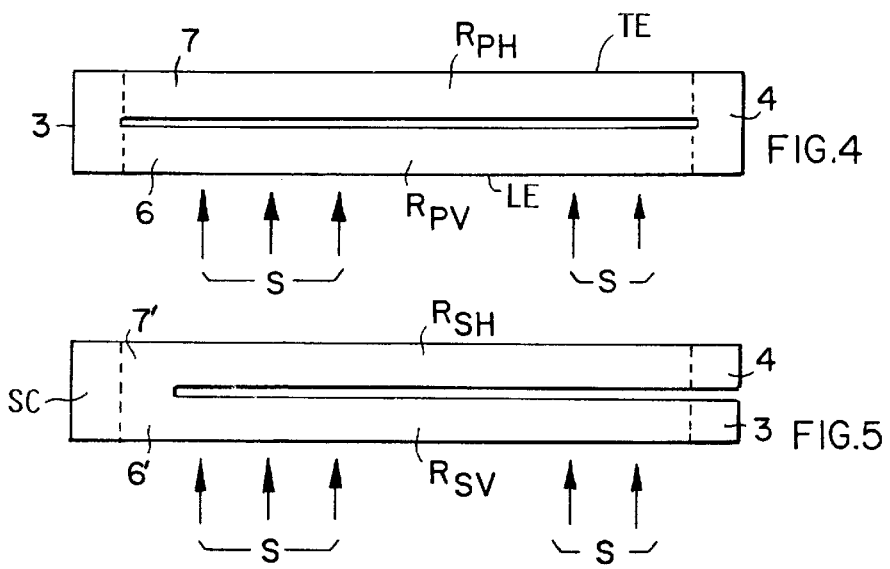
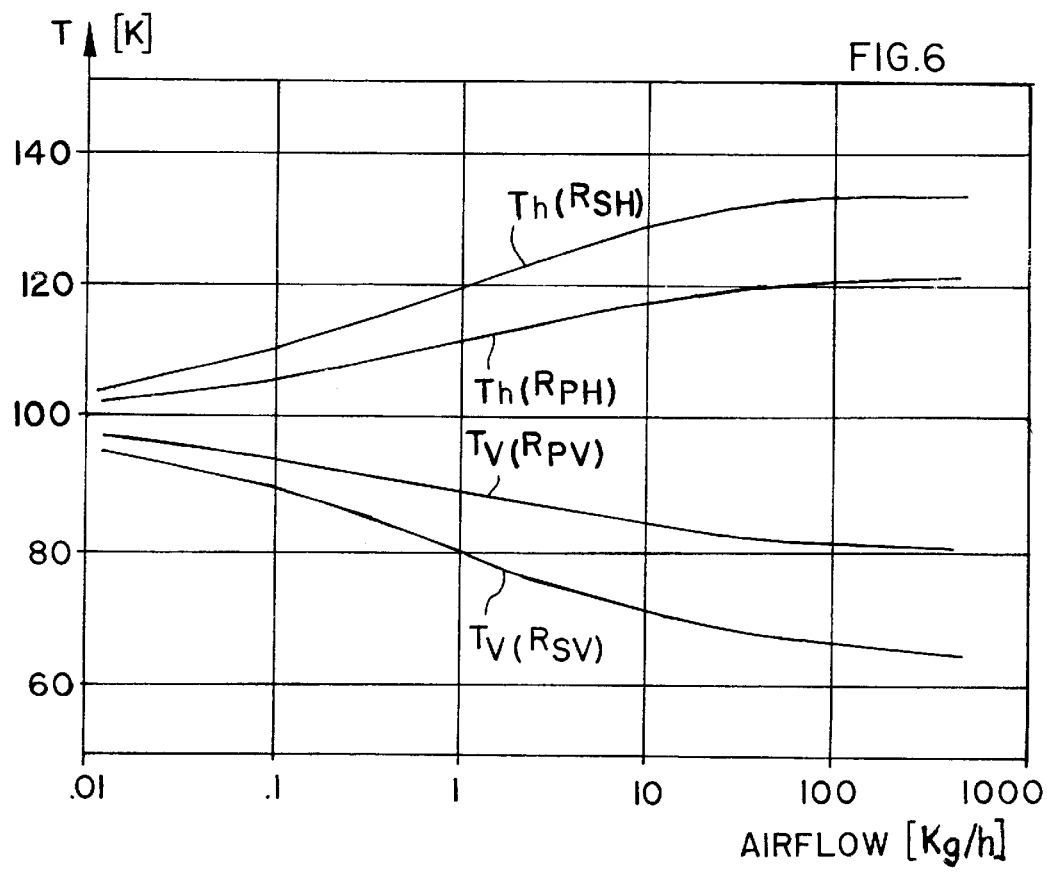

SENSOR ARRANGEMENT FOR MEASURING THE MASS OF A FLOWING FLUID

FIELD OF THE INVENTION

A flowing fluid mass sensor constructed on the principle of a hot wire anemometer is used particularly for measuring or monitoring fluid flows in an internal combustion engine, for example in a motor vehicle. Such a sensor has a flow measurement resistor in the form of a film resistor around which the fluid flows. The resistor is connected in a measurement bridge constructed as a constant-resistance regulator.

BACKGROUND INFORMATION

A sensor arrangement of this kind is known from German Patent Publication DE 38 02 422 A1. Thin-film resistors on various substrates, e.g. ceramic or glass, are generally used as sensor elements. The rapid response characteristic of hot-film anemometers is a decisive factor if such sensors are to be used in the intake section of an internal combustion engine. A rapid response rate or characteristic is needed in order for the sensor to follow the pulsations of the air intake and thus to indicate the true air flow. A common method of increasing the response rate of thermal anemometers is to miniaturize the sensor element in order to reduce the size of the thermal energy store.

Such miniaturization has the following disadvantages: The sensitivity to contamination of the sensor element increases. If the length of the sensor element is reduced transversely to the direction of flow, the air flow is averaged over only a short length and this leads to an increase in the noise content of the measured signal.

Thin-film resistors are generally structured such as to achieve a desired resistance value. This has the advantage that the layer thickness of the resistor material can be chosen optimally for the technology used with respect to the stability of the measuring element. Generally, the resistance layout is a meander of equal width circuit tracks connected in series. Present FIG. 7 shows a resistance layout of this kind. Other geometries are also known.

German Patent Publication DE 31 27 061 shows a resistance layout where the width of the circuit tracks connected in series is selected such that the resulting electrical resistance per unit area has a constant relationship to the local heat transfer coefficient. The width of the circuit tracks then increases continuously towards the rear as viewed from the approach flow side. A resistance layout of this kind is shown in present FIG. 8.

A disadvantage of these conventional layouts is seen in that thermal positive feedback results due to connecting the circuit tracks in series. Further, when the air flow is increased the circuit tracks located close to the leading edge of the sensor are cooled to a relatively greater extent than circuit tracks located downstream of the leading edge as viewed in the flow direction. Consequently, the temperature near the leading edge drops in relation to the circuit tracks that are not cooled to the same extent. A positive feedback effect occurs because less electrical power is converted in the cooler circuit tracks owing to the lower electrical resistance, and this in turn leads to further cooling. The constant temperature control circuit keeps the temperature constant, but only on average. These local temperature changes are responsible for lengthening the response rate because these temperature changes take place slowly. Another important factor is seen in that the sensor elements are normally formed by a single-sided resistance coating whereby a succession of time constants must be taken into account because the static temperature distribution settles on the underside of the measuring element or sensor only when the temperature distribution has settled on the resistance side of the sensor.

As is known from existing literature, e.g. H. Strickert "Hitzdraht- und Hitzfilm-Anemometrie" (Hot Film and Hot Wire Anemometry) 1974, the response rate of anemometers is improved by applying the constant temperature principle. The constant temperature principle has thus been able to establish itself generally even against the constant current principle.

An ideal hot film measuring element or sensor would have at all points on its surface at all moments of time the same constant temperature which is higher than the fluid temperature by a fixed value. For hot film sensors in industrial applications or applications in measuring units, where the production costs are not as critical as for hot film sensor elements for series installation in internal combustion engines, all-round metallized miniaturized sensor elements are generally used that very closely approximate the ideal. The metallized resistance coating is not structured.

Hot film sensor elements used in internal combustion engines have typical dimensions of approximately 0.2 mm×2 mm×10 mm. These sensors are mounted on glass or ceramic carriers coated with structured or configured resistance material. The dimension of the sensor in the direction of flow S is approximately 2 mm and results in a local heat transfer coefficient that changes considerably from the leading to the trailing edge of the sensor. This change in the heat transfer coefficient results in thermal positive feedback effects as described in the prior art. The positive feedback effects reduce the response rate of the known sensor.

Another prior art sensor has two separate resistors on a carrier body and is known as a "Split-film probe", which is described, for example, in the Technical Bulletin No. 20 issued by TSI Inc., St. Paul, Minn., USA, and in German Patent Publication DE 39 35 778. The known sensor is used to detect the direction of flow by comparing the signals from the two resistors.

SUMMARY OF THE INVENTION

The object of the invention is to provide a sensor element that has an increased namely a shortened or more rapid response rate while simultaneously avoiding disadvantages such as those arising from the miniaturization of the measuring element or sensor.

According to the invention there is provided a sensor arrangement in which at least two resistance tracks are connected in parallel and which are arranged perpendicularly to the direction of flow in such a way that one track is located at the leading edge and the other track at the trailing edge. Because the resistance tracks are connected in parallel, a negative feedback effect is achieved. If the resistance track on the leading edge is cooled by a relatively large amount as a result of an increase in the air flow, its temperature drops and hence its electrical resistance. The reduction in resistance causes the current through the forward resistance track to increase which results in an increase in the electrical power, whereby the temperature in the resistance track at the leading edge is increased due to a negative feedback effect. Consequently, the temperature distribution on the sensor element changes considerably less than in the state of the art, and this produces a somewhat smaller measurement signal but at the same time a considerable reduction of the time constants.

In a preferred embodiment of the invention, the symmetrical meander-shaped arrangement of the resistance tracks shows the best negative feedback effects while allowing a good utilization of the surface area for a given magnitude of resistance, which is of particular significance for miniaturization. This feature applies similarly to the rectangular version which furthermore is the easiest to realize from a production point of view. The preferred carrier material is glass.

In a further embodiment of the invention, two electrically isolated resistors are applied on a carrier body. Each of these resistors has its resistance tracks connected in parallel in accordance with the invention. This is required in order to detect the direction of flow and is of particular importance when a hot-film probe is used in the intake section of an internal combustion engine because reverse flow occurs at particular operating points of the engine due to vibration. If this reverse flow is measured with its absolute value, as is common practice at the present time, a considerable error in measurement results which, after the measured signal has been processed further, leads to an incorrect injection timing and consequently to a deteriorated exhaust gas quality.

It is a precondition for the directionally correct measurement that the measured signal follows the air mass flow with an absolute minimum of delay. The duration of reverse flow is typically in the range of 0 ms to 10 ms.

The application of the principle of parallel connection of the resistance meanders situated one behind the other in the direction of flow in accordance with the invention is therefore advantageous in particular in the case of probes with the facility of detecting the direction of flow.

BRIEF DESCRIPTION OF THE DRAWINGS

The invention will now be described by way of example with reference to the accompanying drawings and a simplified model calculation, wherein:

FIG. 1 shows a resistance layout in accordance with the invention with symmetrical resistor tracks arranged in parallel to each other and perpendicularly to the direction of flow and also connected electrically in parallel to each other;

FIG. 2 is a sectional view through the resistance layout shown in FIG. 1;

FIG. 3 is a resistance layout in accordance with this invention shown perspectively in a flow tube wherein a carrier body has two separate resistors each of which is made up of two resistor tracks connected in parallel as shown in FIG. 1;

FIG. 4 shows a simplified resistance layout in accordance with this invention with a resistor comprising two parallel tracks for the purpose of explaining the mode of operation of the invention;

FIG. 5 is a simplified resistance layout with a resistor comprising two tracks connected in series and serving as a comparative object to the sensor element shown in FIG. 4;

FIG. 6 illustrates the temperature distribution on the sensors shown in FIGS. 4 and 5;

Figure 7:
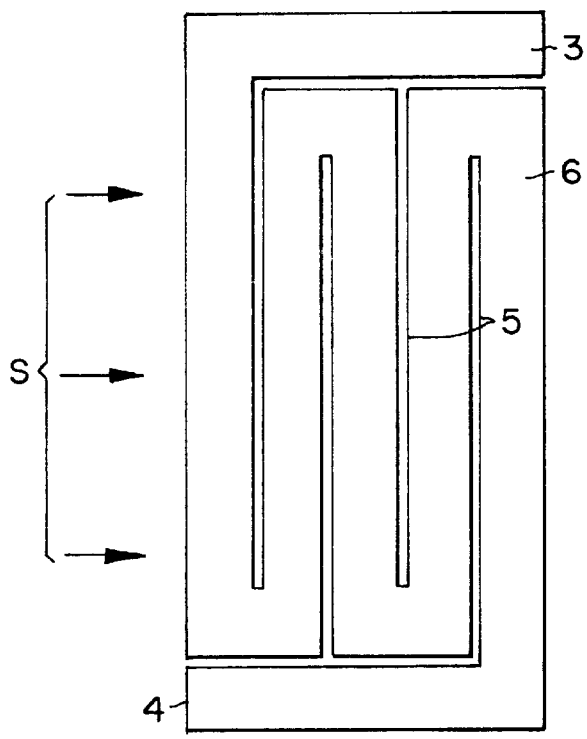
FIG. 7 shows a conventional resistance layout with current tracks of equal width.
Figure 8:
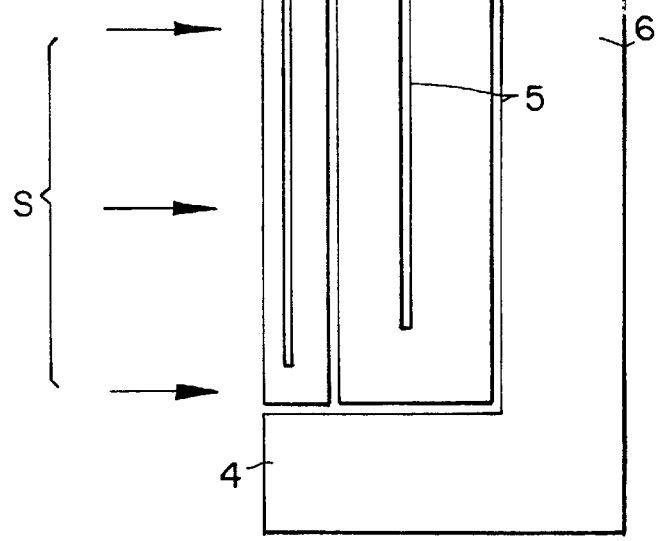
FIG. 8 shows a conventional resistance layout with current tracks of unequal width.

DETAILED DESCRIPTION OF PREFERRED EXAMPLE EMBODIMENTS AND OF THE BEST MODE OF THE INVENTION

FIGS. 1 and 2 show in an example embodiment a sensor element in the form of a resistor film 1 secured on a carrier substrate 2, for example made of glass, with electrical connector zones 3 and 4. First and second meander-shaped resistance tracks 6 and 7 are separated from each other by interruptions 5, 5A and 5C in the resistor film 1. The resistor tracks 6, 7 are electrically connected in parallel with one another in the connector zones 3, 4. The resistor tracks 6, 7 are arranged perpendicularly to a flow direction S of a fluid to be sensed. The interruption 5 in the resistor film 1 has an inverted L-shape. The interruption 5A has an L-shape. The interruption 5B follows a meander-shape or structure which is symmetrical relative to a centerline CL that separates a lead-in zone LZ from a flow-off zone FZ. These zones LZ and FZ extend respectively in parallel to a leading edge LE and a trailing edge TE of the symmetrical structure, whereby resistor track sections 6A, 6B of the resistor track 6 extend only in the lead-in zone LZ and resistor track sections 7A, 7B of resistor track 7 extend only in the flow-off zone FZ. All track sections 6A, 6B, 7A, 7B extend perpendicularly to the flow direction S. The connector zone 4, preferably has a connector extension 4' forming an electrical conductor lead. The resistor track sections 6A and 6B are connected in series with each other at 6C. Similarly, the resistor track sections 7A and 7B are connected in series with each other at 7C.

FIG. 3 shows an arrangement example of a resistance layout in a flow tube in accordance with the invention, where two resistance structures or sensors 1A and 1B are arranged on a carrier substrate or body 2. This arrangement allows detection of the flow direction by operating in accordance with the split-film probe principle. Connector zones 3A, 4A are shown for the first sensor 1A. Connector zones 3B, 4B are shown for the second sensor 1B. Connector leads 4' and 4" are connected to the respective connector zones 4A, 4B.

In order to perform an example calculation, a highly simplified sensor model with two conducting tracks 6 and 7 connected in parallel to each other at the connector zones 3, 4 is used as shown in FIG. 4. A sensor element with two conducting tracks 6' and 7' connected in series at SC as shown in FIG. 5 is used for comparing the parallel connection of the invention with a series resistor track connection. In the calculation, the temperature distributions that settle in as a function of the air flow, are calculated and compared for both versions. The following assumptions are made for both versions:

The temperatures within a resistance track are constant;

the resistors have a linear temperature coefficient $\alpha = 3900$ ppm/K;

the resistance $R_0$ of the individual conductive resistor tracks is 10 $\Omega$ at a reference temperature;

the resistance value of the parallel and series circuit respectively is regulated such that on the sensor element a mean overtemperature of $\delta T = 100K$ relative to the ambient temperature settles in;

the heat flow throughout the carrier body is neglected;

for the heat transfer coefficients $\lambda_v$ for the conductive resistor track at the leading edge LE and $\lambda_h$ for the conductive resistor track at the trailing edge TE values are used that have been determined experimentally.

Calculation for the Parallel Circuit (see FIG. 4):

The resistance values $R_{PV}$, and $R_{Ph}$ for the conductive resistor track 6 at the leading edge LE and the conductive resistor track 7 at the trailing edge TE can be given as a function of their respective temperatures $T_V$ and $T_h$ as follows:

$$R_{PV}(T_V) = R_C \cdot (1 + \alpha \cdot T_V) \quad R_{PH}(T_H) = R_0 \cdot (1 + \alpha \cdot T_H)$$

The electrical powers $P_V$ in the conductive track 6 at the leading edge LE and $P_H$ in the conductive track 7 at the trailing edge TE are a function of the voltage U which is the same on both conductive tracks as follows:

$$P_V = \frac{U^2}{R_{PV}} \qquad P_H = \frac{U^2}{R_{PH}}$$

Because of the heat transferred from the resistor tracks to the air flowing over the resistor tracks, the powers are related to the temperatures $T_V$ and $T_H$ through their heat transfer coefficients $\lambda_V$ and $\lambda_h$ as follows:

$$P_V = T_V \cdot \lambda_V \quad P_H = T_H \cdot \lambda_h$$

The resistance value $Rp_{regel}$ to which the parallel circuit of $R_{PV}$ and $R_{PH}$ is adjusted results from the temperature coefficient $\alpha$ and the desired overtemperature $\delta T$ as follows:

$$R_{P_{regel}} = \frac{R_0}{2} \cdot (1 + \alpha \cdot \delta T)$$

It can also be calculated from the resistances in the parallel circuit as follows:

$$R_{P_{regel}} = \frac{R_{PV} \cdot R_{PH}}{R_{PV} + R_{PH}}$$

By combining these equations, the following relationships result:

$$R_0 \cdot (1 + \alpha \cdot T_V) \cdot T_V \cdot \lambda_V = R_0 \cdot (1 + \alpha \cdot T_H) \cdot T_H \cdot \lambda_h$$

and $$\frac{R_0}{2}(1 + \alpha \cdot \delta T) = R_0 \frac{(1 + \alpha \cdot T_H) \cdot (1 + \alpha \cdot T_V)}{2 + \alpha \cdot (T_V + T_H)}$$

This is a system of equations comprising two equations with the two unknowns $T_V$ and $T_h$ and can be solved analytically. On resolving into $T_V$ or $T_h$, however, the size is unwieldy so that a numerical solution has been adopted. The results calculated are shown in FIG. 6.

Calculation for Series Circuit (refer to FIG. 5):

The resistance values $R_{SV}$ and $R_{Sh}$ for the conductive resistor track 6' at the leading edge LE and the conductive resistor track 7' at the trailing edge TE can be given as a function of their respective temperatures $T_V$ and $T_h$ as follows:

$$R_{SV}(T_V) = R_0 \cdot (1 + \alpha \cdot T_V) \quad R_{SH}(T_H) = R_0 \cdot (1 + \alpha \cdot T_H)$$

The electrical powers $P_V$ in the conductive track 6 at the leading edge LE and TE in the conductive track 7' at the trailing edge $P_h$ are a function of the current I flowing through the two conductive tracks as follows:

$$P_V = I^2 \cdot R_{SV} \quad P_H = I^2 \cdot R_{SH}$$

Because of the heat transferred from the resistor tracks to the air flowing over these tracks, the powers are related to the temperatures $T_V$ and $T_H$ through their heat transfer coefficients $\lambda_V$ and $\lambda_h$ as follows:

$$P_V = T_V \cdot \lambda_V \quad P_H = I_H \cdot \lambda_h$$

The resistance value $RS_{regel}$ to which the series circuit of $R_{SV}$ and $R_{SH}$ is adjusted results from the temperature coefficient $\alpha$ and the desired overtemperature $\delta T$ as follows:

$$RS_{regel} = 2 \cdot R_0 \cdot (1 + \alpha \cdot \delta T)$$

It can also be calculated from the resistances in the series circuit as follows:

$$Rs_{regel} = R_{SV} + R_{SH}$$

By combining these equations, the following relationships result:

$$R_0 \cdot (1 + \alpha \cdot T_V) + R_0 \cdot (1 + \alpha \cdot T_H) = 2R_0 \cdot (1 + \alpha \cdot \delta T)$$

and $$\frac{T_V \cdot \lambda_V}{R_0(1 + \alpha \cdot T_V)} = \frac{T_H \cdot \lambda h}{R_0(1 + \alpha \cdot T_H)}$$

This is a system of equations comprising two equations with the two unknowns $T_V$ and $T_h$ and can be solved analytically. On resolving into $T_V$ or $T_h$, however, the size is unwieldy so that a numerical solution has been adopted. The results calculated are shown in FIG. 6.

As can be seen from FIG. 6, the temperature difference at a high air flow between the conductive track at the leading edge LE and the conductive track at the trailing edge TE in the parallel circuit is 40K as compared with 70K when the tracks are connected in series. The unfavorable temperature difference can therefore be reduced by approximately 40% by using the sensor elements in accordance with the invention. With this arrangement, it is thus possible to increase the response rate. This is particularly the case when the direction of flow reverses because then the temperature distribution between conductive track at the leading edge LE and conductive track at the trailing edge TE are interchanged and slow temperature distributions occur.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

I claim:

1. A sensor for measuring the mass of a fluid flowing in a flow direction (S), said sensor comprising a resistor film (1) formed into a configuration that defines a leading edge for facing said flow direction and a trailing edge for said fluid to flow off said trailing edge, said configuration further having a lead-in zone in parallel to said lead-in edge and a flow-off zone in parallel to said trailing edge, said film resistor (1) comprising at least one first resistor track (6) extending only in said lead-in zone perpendicularly to said flow direction (S) and at least one second resistor track (7) extending only in said flow-off zone perpendicularly to said flow direction (S), said first and second resistor tracks (6 and 7) each having two track ends forming connector zones (3, 4), and wherein said track ends of one resistor track are electrically connected to said track ends of the other resistor track at said connector zones (3, 4), so that said resistor tracks are electrically connected in parallel with each other.

2. The sensor of claim 1, further comprising a carrier body (2), said first and second resistor tracks (6, 7) being secured to said carrier body.

3. The sensor of claim 2, wherein said carrier body is made of glass.

4. The sensor of claim 2, comprising at least two pairs of resistor tracks (1A, 1B), each pair comprising said first and second resistor tracks (6, 7) secured to said carrier body perpendicularly to said flow direction (S) in the same plane one behind the other for exposing said resistor tracks one after the other to said flow, whereby said sensor operates under the split-film probe principle for detecting said flow direction (S).

5. The sensor of claim 4, wherein said carrier body is made of glass.

6. The sensor of claim 1, wherein said first and second resistor tracks (6, 7) form said configuration as a substantially rectangular configuration.

7. The sensor of claim 6, further comprising a carrier body to which said substantially rectangular arrangement is symmetrically secured relative to a center line separating said lead-in zone from said flow-off zone on said carrier body.

8. The sensor of claim 1, wherein each of said first and second resistor tracks has at least two resistor track sections (6A, 6B; 7A, 7B), and further comprising electrical connections connecting said resistor track sections of the same resistor track in series with each other (at 6C and 7C).

9. The sensor of claim 8, further comprising connector leads (4') electrically connected to said connector areas (4).

10. The sensor of claim 1, wherein said resistor film (1) comprises at least one interruption (5) in said resistor film, said at least one interruption (5) separating said first and second resistor tracks (6,7) from each other except at said electrically connected connector zones (3, 4).

11. The sensor of claim 1, wherein said resistor tracks (6, 7) have the same track width all along a respective track length.

12. The sensor of claim 1, wherein said first and second resistor tracks have substantially the same length perpendicularly to said flow direction.

* * * * *

UNITED STATES PATENT AND TRADEMARK OFFICE
CERTIFICATE OF CORRECTION

PATENT NO. : 5,817,933
DATED : Oct. 6, 1998
INVENTOR(S) : Daetz

It is certified that error appears in the above-identified patent and that said Letters Patent is hereby corrected as shown below.

On the title page, under [56] References Cited,
FOREIGN PATENT DOCUMENTS, delete line 2;

Col.1, line 42, after "Publication" replace "DE 31 27 061" by --DE 31 27 081--;

Col. 4, line 67, replace "$R_{PV}(T_V) = R_C \cdot (1 + \alpha \cdot T_V)\ R_{PH}(T_H) = R_O \cdot (1 + \alpha \cdot T_H)$"
by --$R_{PV}(T_V) = R_O \cdot (1 + \alpha \cdot T_V)$     $R_{PH}(T_H) = R_O \cdot (1 + \alpha \cdot T_H)$--;

Col. 5, line 15, replace "$P_V = T_V \cdot \lambda_V\ P_H = T_H\ \lambda_h$" by --$P_V = T_V \cdot \lambda_V$     $P_H = T_H\ \lambda_h$--;
line 52, replace "$R_{SV}(T_V) = R_O \cdot (1 + \alpha \cdot T_V)\ R_{SH}(T_H) = R_O \cdot (1 + \alpha \cdot T_H)$"
by --$R_{SV}(T_V) = R_O \cdot (1 + \alpha \cdot T_V)$     $R_{SH}(T_H) = R_O \cdot (1 + \alpha \cdot T_H)$--;
line 60, replace "$P_V = I^2 \cdot R_{SV}\ P_H = I^2 \cdot R_{SH}$" by
--$P_V = I^2 \cdot R_{SV}$     $P_H = I^2 \cdot R_{SH}$--;
line 67, replace "$P_V = T_V \cdot \lambda_V\ P_H = I_H\ \lambda_h$" by --$P_V = T_V \cdot \lambda_V$     $P_H = T_H \cdot \lambda_h$--;

Col. 6, line 1, after "value" replace "$RS_{regel}$" by --$Rs_{regel}$--;
line 6, replace "$RS_{regel} = 2 \cdot R_O(1+\alpha \cdot \delta T)$" by --$Rs_{regel} = 2 \cdot R_O(1+\alpha \cdot \delta T)$--.

Signed and Sealed this

Ninth Day of February, 1999

Attest:

Attesting Officer

*Acting Commissioner of Patents and Trademarks*